United States Patent [19]

Jacobson

[11] 4,390,751
[45] Jun. 28, 1983

[54] END OF REWIND DETECTION IN A TELEPHONE ANSWERING DEVICE HAVING REMOTE PLAYOUT

[76] Inventor: Sava Jacobson, 8130 Orion St., Van Nuys, Calif. 91406

[21] Appl. No.: 224,042

[22] Filed: Jan. 12, 1981

Related U.S. Application Data

[62] Division of Ser. No. 111,589, Jan. 14, 1980, Pat. No. 4,315,104.

[51] Int. Cl.³ .............................................. H04M 1/64
[52] U.S. Cl. .................................. 179/6.07; 179/6.14; 179/6.13; 360/74.4; 360/74.2
[58] Field of Search .................... 179/6.07, 6.11, 6.13, 179/6.14, 1 VC, 6.09; 340/648, 689, 675; 369/50, 53, 56, 57, 58; 242/200, 201, 186; 360/31, 74.4, 74.3, 74.2, 74.1

[56] References Cited

U.S. PATENT DOCUMENTS 3,461,249 8/1969 Kamoji ............................ 360/74.4
3,991,274 11/1976 Darwood ......................... 179/6.11
4,104,487 8/1978 Jacobson ......................... 179/6.11
4,197,532 4/1980 Lawson .......................... 340/648

Primary Examiner—Alan Faber

Attorney, Agent, or Firm—Spensley, Horn, Jubas & Lubitz

[57] ABSTRACT

This telephone answering device has facilities for the remote controlled playout of previously recorded incoming messages. In response to receipt of a coded signal, a cam control mechanism positions the message tape drive motor first to rewind the incoming message tape, and then to drive the tape forward for remote playout of the messages. The control mechanism is configured to sense whether the tape drive motor is correctly positioned at the beginning of an answering cycle. If not, the cam control mechanism is actuated quickly to correctly position the tape drive motor. Thus the answering device will operate properly even in the event that the cam control mechanism was left in an improper position during the previous answering or remote playout cycle, for example, as a result of a power interrupt during that cycle.

Additionally, circuitry is disclosed for detecting the end-of-rewind of the incoming message tape by monitoring either (a) the audio signal produced by the playback head as the message tape is rewound, or (b) the brush noise of the message tape drive motor. An end-of-rewind signal is produced when the audio signal output or the brush noise terminates upon completion of rewind.

5 Claims, 7 Drawing Figures

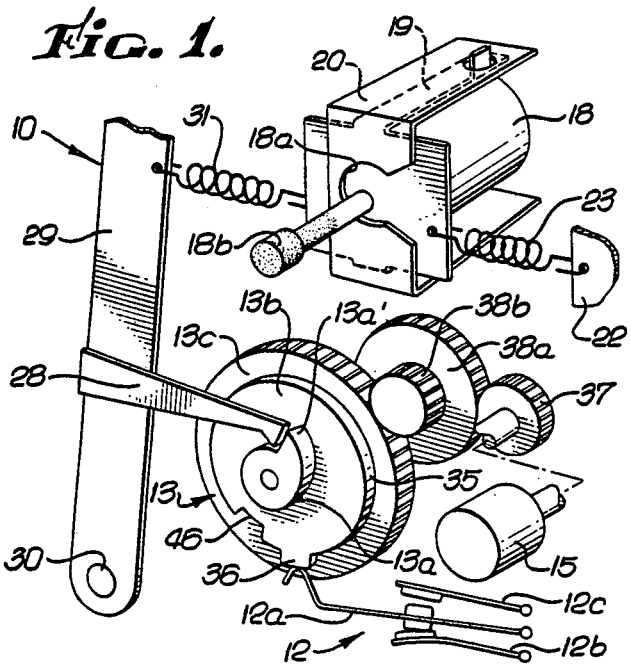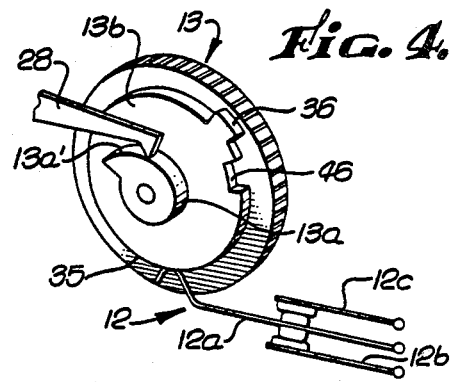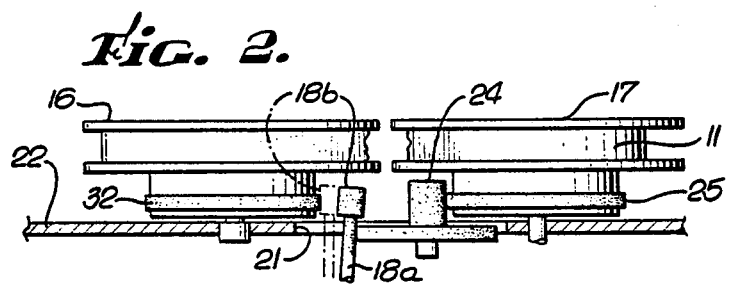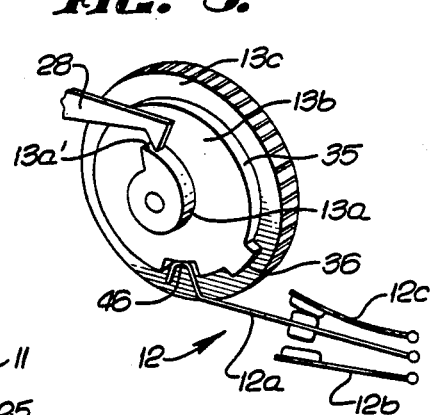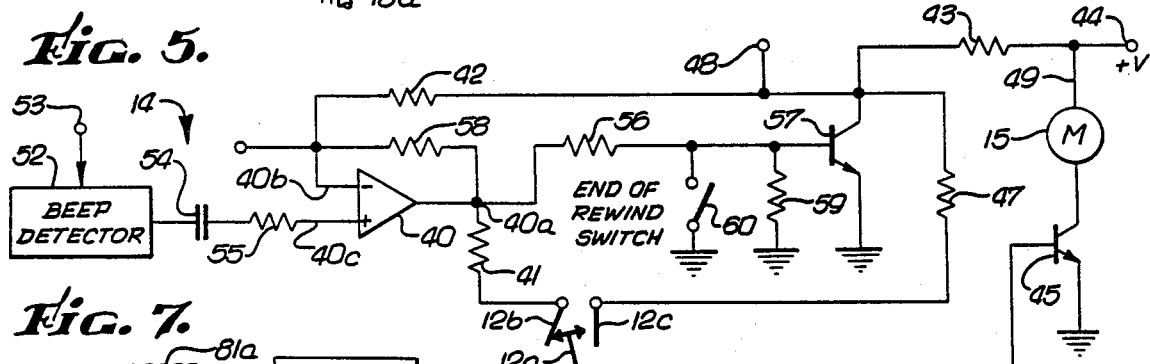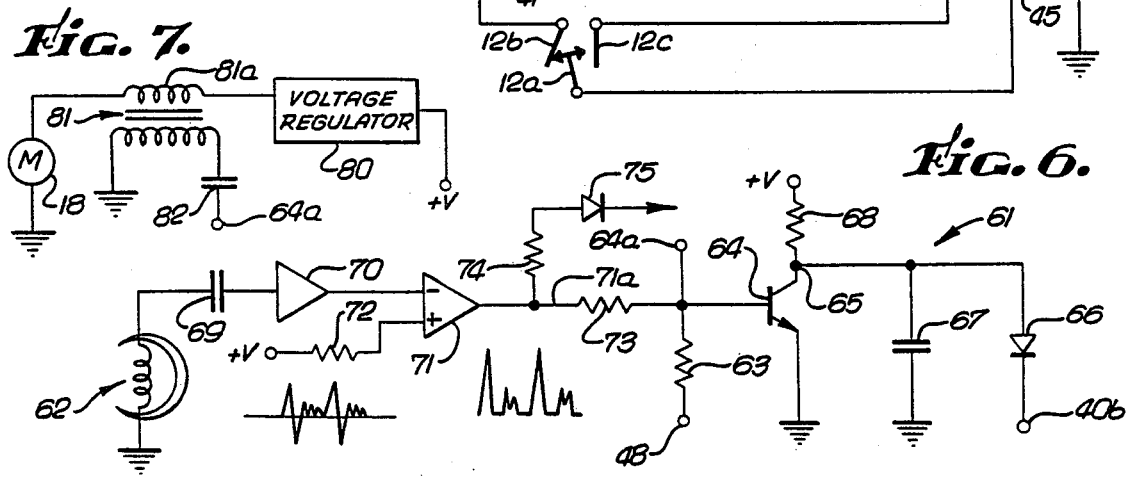

END OF REWIND DETECTION IN A TELEPHONE ANSWERING DEVICE HAVING REMOTE PLAYOUT

This is a division of application Ser. No. 111,589, filed Jan. 14, 1980 now U.S. Pat. No. 4,315,104.

BACKGROUND OF THE INVENTION

1. Field of the Invention

The present invention relates to an automatically reset control mechanism for implementing the playback under remote control of incoming messages recorded by a telephone answering device.

2. Description of the Prior Art

A telephone answering device having remote controlled playback enables a user to obtain his messages without returning to the physical location of the answering device. To accomplish this, the user places a telephone call to his own number. The call is answered automatically by the answering device. At an appropriate time during the answering cycle the user transmits a coded signal, for example, a "beep" tone produced by a small oscillator that is held against the telephone handset microphone. The telephone answering device recognizes this specific signal, and switches to the automatic playback mode. The incoming message tape is rewound, and the recorded messages then are played back over the telephone line to the user. When all of the messages have been played out, the device is reset to the answering mode and shut down in readiness to receive the next call.

A cam control mechanism advantageously is used in such a device to implement automatic rewinding of the tape and transfer of the tape drive mechanism to the forward direction for playout of the recorded messages. Such mechanisms are taught e.g., in the inventor's U.S. Pat. Nos. 4,104,487 and 4,126,763 as well as in the inventor's copending U.S. patent applications, Ser. No. 879,279 filed Feb. 21, 1978, now U.S. Pat. No. 4,197,426, Ser. No. 925,370 filed July 17, 1978, now U.S. Pat. No. 4,213,010 Ser. No. 941,282 filed Sept. 11, 1978, now U.S. Pat. No. 4,201,888, and Ser. No. 27,911 filed Apr. 6, 1979, now U.S. Pat. No. 4,236,044.

In these systems, a cam is used to transfer the motor, which drives the incoming message tape, between forward and rewind drive positions. In the ready condition, the tape drive motor is positioned for forward tape motion. Upon receipt of a "beep" tone or other remote playout control signal, the cam drive motor rotates the cam so as to transfer the tape drive motor to the rewind position. The cam remains so situated until rewind is complete. The cam mechanism then is reactuated to return the tape drive motor to the forward position, so that the messages can be played out.

A problem exists with such cam control mechanisms. In the event of a power interruption during the changeover cycle, the cam mechanism may be left in an improper orientation. For example, the tape drive motor may be left in the rewind position. After power is restored, during the next answering cycle the incoming message tape will be driven improperly in the reverse direction. As another example, the power interrupt may occur as the cam mechanism is in the midst of transferring the tape drive motor. In this instance, when power later is applied during an answering cycle, the outgoing announcement tape may not be moved at all. As a third example, the tape drive motor may be in the forward position, but with the cam rotated sufficiently so as to disengage the control switch associated with the cam mechanism. In such instance a normal answering cycle may be implemented, but proper remote controlled playout will not be possible.

Thus it is a principle object of the present invention to provide a cam control mechanism that is automatically restored to the correct ready position when power is applied to the telephone answering device, if the orientation at that time is incorrect. The cam orientation is sensed, and the cam drive motor is energized if necessary so as to return the cam mechanism to the correct position.

In some known telephone answering devices, solenoids are used to position the tape drive motor. Such solenoids automatically return the tape drive motor to the proper rest condition when de-energized, and therefore do not have the inherent shortcoming which the present invention eliminates. Another object of the present invention is to simulate solenoid operation by providing an improved cam control mechanism which automatically correctly repositions the tape drive motor after a power interrupt, but without the use of solenoids.

During operation of the cam control mechanism it is necessary to determine when rewinding of the incoming message tape is complete. One technique is to employ a feeler switch which is actuated when the tape on the supply reel reaches a certain diameter. This technique is inaccurate because the tape diameter may vary somewhat depending on whether the tape is more tightly or loosely wound onto the spool during rewind. Thus if the tape is loosely wound, the feeler switch may close prematurely, before all of the tape has actually been rewound onto the supply reel.

Another technique for sensing that rewind is complete is to provide an electrically conductive strip on the message tape near the leading end thereof. Completion of rewind then can be detected when this conductive strip shorts together a pair of contacts physically situated along the tape path near the supply reel. Still another method is to sense the increased drag on the motor caused by the greater tape tension when rewind is complete. A further method is shown in the U.S. Pat. No. 3,991,274 to Darwood. There a microswitch is eccentrically connected to the feed spindle of the message tape drive mechanism so as to be intermittently opened and closed as the tape is rewound. The resultant pulses produced by the microswitch are sensed by a circuit which produces an end-of-rewind signal when the pulses terminate. These techniques, however, require additional circuitry or mechanisms that add to the cost of the device.

Another object of the present invention is to provide a means for detecting the end of rewind of the incoming message tape by monitoring the audio output of that tape during rewind. Termination of such audio indicates that rewind is complete.

A further object is to provide an alternative means for detecting the end of rewind by monitoring the brush noise from a tightly coupled message tape drive motor. When the motor stalls at the end of rewind, the brush noise terminates to indicate rewind completion.

SUMMARY OF THE INVENTION

These and other objectives are achieved in the inventive telephone answering device having remote controlled playback capability. Remote playout is implemented by a cam control mechanism that appropriately transfers the incoming message tape drive motor between forward and rewind positions. The orientation of the cam mechanism is sensed by a switch that is connected in an appropriate control circuit. When power first is applied to the telephone answering device at the beginning of an answering cycle, the switch and circuit cooperate to ascertain whether the cam is correctly oriented. If it is not, the circuit then energizes the cam drive motor so as to reposition the cam mechanism, and hence the tape drive motor, to the proper position requisite for normal answering and remote controlled playback operation.

Circuitry further is provided for monitoring the audio picked up from the incoming message tape while it is being rewound. In response to the termination of this audio, the circuitry provides to the cam control mechanism a signal indicating that tape rewind is complete.

BRIEF DESCRIPTION OF THE DRAWINGS

A detailed description of the invention will be made with reference to the accompanying drawings, wherein like numeral designate corresponding elements in the several figures.

FIG. 1 is pictorial view of the cam control mechanism used to transfer the tape drive motor between the forward position (which is illustrated in this figure) and the rewind position.

FIG. 2 is side elevation view, partly broken away and in section, showing the incoming message tape supply and pick up reels for a telephone answering device, and showing the connection of the tape drive motor with these reels.

FIGS. 3 and 4 are partial pictorial views of the cam control mechanism of FIG. 1, oriented respectively in the rewind position, and in the intermediate condition in which the tape drive motor is being transferred from the forward to the rewind position.

FIG. 5 is an electrical schematic diagram of the control circuit used to facilitate control and automatic resetting of the cam mechanism of FIG. 1, in accordance with the present invention.

FIG. 6 is an electrical schematic diagram of a circuit for sensing the rewind complete condition by monitoring the message tape audio output, and useful in conjunction with the control circuit of FIG. 5.

FIG. 7 is an electrical schematic diagram of an alternative circuit for sensing rewind completion by monitoring the brush noise from the message tape drive motor.

DESCRIPTION OF THE PREFERRED EMBODIMENTS

The following description is of the best presently contemplated modes of carrying out the invention. The description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

FIGS. 1 and 2 show a cam control mechanism 10 used in connection with the remote controlled playback of incoming messages recorded on a tape 11. The mechanism 10 is similar to that disclosed in the inventor's above identified patents and patent applications, except for the arrangement of a switch 12 which senses the orientation of a cam 13. The switch 12 is electrically connected to the circuitry 14 of FIG. 5 which operates the cam mechanism 10 to implement remote controlled playback of recorded messages. The circuit 14 also cooperates with the switch 12 and a cam drive motor 15 to reset the cam mechanism 10 automatically to the proper rest position (shown in FIG. 1) in the event that the mechanism 10 was left in an improper orientation during a prior answering cycle, for example, as a result of a power interruption.

The message tape 11 is driven between a supply reel 16 and a takeup reel 17 by a tape drive motor 18 having a shaft 18a with an enlarged, circular end 18b. The motor 18 is attached to a U-shaped bracket 19 which itself is pivotally mounted within a U-shaped support bracket 20. The shaft 18a projects upwardly through an opening 21 (FIG. 2) in the chassis 22 of the telephone answering device. A relatively weak spring 23, connected between the support bracket 19 and the chassis 22, pivotally biases the motor 18 to the "forward" position shown in solid in FIG. 2. In this forward position (FIGS. 1 and 2) the motor 18 drives the takeup reel 17 via the shaft 18a, an idler 24 and a friction disc 25 attached to the tape takeup reel 17.

To transfer the motor 18 to the rewind position, the cam drive motor 15 rotates the cam 13, as described below, to the orientation shown in FIG. 3. During such rotation, a first cam section 13a drives a cam follower 28 and arm 29 counterclockwise (as viewed in FIG. 1) about a pivot 30 which mounts the arm 29 to the chassis 22.

The arm 29 is connected by a spring 31 to the bracket 19. The spring 31 is stronger than the spring 23. Thus counterclockwise motion of the arm 29 pulls the bracket 19 and causes the motor 18 to pivot into the rewind position. As shown in phantom in FIG. 2, in this position, the motor 18 drives the supply reel 16 via the shaft end 18b which engages a friction disc 32 on the supply reel 16. The supply reel 16, the takeup reel 17 and the idler 24 all are rotationally mounted to the chassis 22.

At the end of rewind, when the cam 13 is returned to the orientation shown in FIG. 1, the motor bracket 19 no longer is pulled towards the rewind position by the arm 29. The spring 23 now returns the motor 18 to the forward position.

The switch 12 has an arm 12a that engages a second cam section 13b of the cam 13. When the switch arm 12a rests against the intermediate portion 35 of the cam section 13b (FIG. 4), electrical connection is made from the switch arm 12a to both of a pair of switch contacts 12b and 12c. In the "forward" orientation of FIG. 1, a raised area 36 on the cam section 13b urges the switch arm 12a away from the contact 12c so that the arm makes electrical connection only to the contact 12b. This is the proper orientation for the cam control mechanism 10 at the beginning of an answering cycle.

If the mechanism 10 is properly positioned when power is applied to the telephone answering device at the beginning of an answering cycle, the cam motor 15 will not be energized by the circuit 14. However, in the event that the cam control mechanism 10 is then incorrectly positioned, the circuit 14 will sense this condition, using the switch 12, and will apply power to the motor 15. The motor 15 will drive the cam 13 until it returns to the forward position shown in FIG. 1. The switch arm 12a then will be disconnected from contact 12c, in response to which the circuit 14 will remove power from the motor 15. To accomplish the driving operation, the cam motor 15 is connected to the cam 13 via a set of gears 37, 38a, 38b and a gear section 13c of the cam 13.

Referring to FIG. 5, the circuit 14 employs an operational amplifier 40 the output 40a of which is connected via a resistor 41 to the switch contact 12b. The inverting (−) input 40b of the amplifier 40 is connected via a pair of resistors 42, 43 to a terminal 44 which receives positive voltage (+V) when the telephone answering device is enabled in response to the detection of a ring signal.

When this occurs, the voltage +V that is applied to the terminal 40b drives the amplifier output 40a to a low level. This low level is communicated via the switch contact 12b and the switch arm 12a to the base of a transistor 45 which acts as a switch for the motor 15. The low signal keeps the transistor 45 off, so that no voltage is supplied to the motor 15. In other words, if the cam control mechanism 10 is properly positioned at the beginning cycle, as shown in FIG. 1, the motor 15 will not be energized at this time.

On the other hand, if the cam control mechanism 10 is not properly positioned, the motor 15 will be energized. Such improper positioning is indicated by either of two conditions: (a) the mechanism 10 is in the intermediate position (FIG. 4) with the switch arm 12a making electrical connection to both contacts 12b or 12c, and (b) the cam mechanism 10 is in the rewind position (FIG. 3) in which the switch arm 12a is biased downward into a recess 46 in the cam section 13b so that the arm 12a only connects to the contact 12c.

Thus, in both of the improper positions of the cam mechanism 10, the switch arm 12a will be electrically connected to the contact 12c at the beginning of the answering cycle. As seen in FIG. 5, the contact 12c is connected via a resistor 47 to the junction 48 of the resistors 42 and 43. When power is applied to the circuit 14 at the beginning of the answering cycle, the node 48 rises to a positive voltage. This positive voltage will be communicated via the resistor 47, the switch contact 12c and the switch arm 12a to the transistor 45, which will then go on. As a result, power will be supplied to the motor 15 from the +V terminal 44 via a line 49, the motor 15, the collector-to-emitter path of the transistor 45 to ground.

As a result of this energization, the motor 15 will turn the cam 13 until the position shown in FIG. 1 is reached. When that occurs, the switch arm 12a will be moved away from the contact 12c, so that positive voltage will be removed from the base of the transistor 45. The transistor 45 then will go off, turning off the motor 15 and leaving the cam control mechanism 10 in the proper quiescent position. In this manner the present invention insures that the cam control mechanism 10 will be set to the correct orientation at the beginning of each answering cycle.

To actuate remote controlled playout of the messages recorded on the tape 11, the user transmits a "beep" tone or other coded signal which is sensed by a detector 52 (FIG. 5) which receives audio from the telephone line via a terminal 53. Upon receipt of the coded signal, the detector 52 produces a pulse that is supplied to the non-inverting (+) input 40c of the amplifier 40 via a capacitor 54 and a resistor 55. This pulse is of sufficient magnitude to cause the amplifier output 40a to rise to a high level. This high signal, provided via a resistor 56, turns on a transistor 57 that is connected between the node 48 and ground. As a result, the potential at the node 48, and hence the potential at the amplifier (−) input 40b, goes low. This sets the amplifier 40 to a high output condition which is maintained even after termination of the pulse at the input 40c. A pair of resistors 58, 59 aid stability of the circuit 14, but are not essential to its operation.

Since the cam control mechanism 10 is in the position shown in FIG. 1, the high output state of the amplifier 40 turns on the motor 15. This occurs since the high voltage at the amplifier output 40a turns on the transistor 45 via the path including the resistor 41, the switch contact 12b and the switch arm 12a. The cam motor 15 begins to rotate the cam 13 in a clockwise direction as viewed in FIG. 1. As the follower 28 rides toward the large diameter end 13a' of the cam section 13a, the arm 28 correspondingly pivots to the left, thereby pulling the tape drive motor 18 into the rewind position shown in FIG. 3. When this position is reached, the switch arm 12a moves away from the contact 12b, and remains connected only to the contact 12c. As a result, the signal path from the amplifier output 40a to the transistor 45 is open circuited, thereby turning off the transistor 45 and de-energizing the motor 15. The transistor 57 is still on, so that the node 48 and the base of the transistor 45 are held low. The cam control mechanism 10 thus remains in the rewind position.

The motor 18 now rewinds the tape 11 onto the supply reel 16. When rewind is complete, an end of rewind switch 60 is closed. This turns off the transistor 57 by shorting its base to ground. As a result, the node 48 again rises towards the +V level. The resulting high signal turns on the transistor 45 through the path including the resistor 47, the switch contact 12c and the switch arm 12a. At the same time, the high signal to the inverting (−) input of the amplifier 40 resets the output 40a to the low state.

The motor 15 now continues to turn the cam 13 in the clockwise direction, beginning from the rewind position of FIG. 3. The follower 28 "drops" off of the end 13a' of the cam section 13a and comes to rest at the small radius section of the cam 13a, as shown in FIG. 1. The spring 23 returns the tape drive motor 18 to the forward position. The cam section 13b forces the switch arm 12a away from the contact 12c and against the contact 12b. As a result, the high signal from the node 48 is removed from the base of the transistor 45, which instead is connected to the low output 40a of the amplifier 40. This turns off the motor 15, and leaves the cam control mechanism 10 in the forward position of FIG. 1. The tape drive motor 18 now drives the tape 11 in the forward direction so that the previously recorded messages can be played out over the telephone line to the user. The mechanism 10 remains in this condition of FIG. 1 either until the end of the answering cycle, or until another remote playout request coded signal is received from the user.

Although in FIGS. 1 and 2 the tape supply and take-up reels 16, 17 are driven directly by the shaft 18a, 18b of the motor 18 that is tilted by the cam control mechanism 10, the invention is not so limited. Thus, for example, the reels 16, 17 may be driven by the motor 18 via a drive wheel which is moved between foward and rewind positions by the cam control mechanism 10, while the motor 18 itself remains stationary. Such a movable drive wheel arrangement is particularly well suited to a telephone answering device in which a tape cassette is used in place of a reel-to-reel incoming message tape. As another example, the tape drive motor 18 may be alternately connected to drive the message tape 11 in a forward or rewind direction via separate gears which are respectively alternately engaged by the cam control mechanism 10.

In the optional embodiment of FIG. 6, the mechanical end-of-rewind switch 60 in the circuit 14 is replaced by a circuit 61 which detects the end of rewind condition by monitoring the audio output of the playback head 62 associated with the message tape 11.

When the cam control mechanism 10 is in the condition shown in FIG. 1, the voltage at the node 48 (FIG. 5) is high. This high voltage, supplied via a resistor 63, maintains a transistor 64 in the on state. As a result, the collector node 65 remains low, and no signal is injected into the amplifier input 40b via a diode 66. However, when the cam mechanism 10 is in the rewind position of FIG. 3, the node 48 is low. In this situation the circuit 61 is responsive to audio from the playback head 62.

During rewind, a capacitor 67 is charged toward the +V level via a resistor 68. The values of the capacitor 67 and the resistor 68 are chosen to have a time constant that is slightly longer than typical consecutive audio pulses from the playback head 62. For example, a time constant of two seconds may be employed.

As the tape 11 is rewinding, audio will be picked up by the playback head 62 and supplied via a capacitor 69 to the preamplifier 70 and amplifier 71 that are used to amplify the recorded messages during normal message playback. The audio is supplied to the inverting (−) input of the amplifier 71, while the non-inverting (+) is biased to a positive voltage via a resistor 72. With this arrangement, the amplifier output 71a consists of positive going voltage pulses at the peaks of the detected audio. This pulse signal is supplied via a resistor 73 to the base node 64a of the transistor 64. Each such pulse turns on the transistor 64, thereby discharging the capacitor 67.

Thus during rewind, as long as audio is picked up by the head 62, the pulses on the line 71a will occur sufficiently often to prevent the capacitor 67 from becoming fully charged. However, when the tape 11 is completely rewound, no more audio will be picked up by the head 62. The absence of pulses on the line 71a for the charging time constant (typically 2 seconds) of the capacitor 67 will permit that capacitor to become charged to approximately the +V level. When this occurs, current will be injected from the node 65 via the diode 66 into the amplifier inverting (−) terminal 40b. The amplifier 40 will flip to the low output state. As a result, the transistor 57 will go off and the node 48 will go high. This will turn on the cam drive motor 15 as described above, driving the cam mechanism 10 to the forward condition of FIG. 1. The high signal at the node 48 also will turn on the transistor 64, thereby discharging the capacitor 67 and clamping the node 65 to ground. The node 65 will remain clamped to ground throughout forward movement of the tape 11, both during remote playout and during normal answering operation.

Note that the circuit 61 replaces the mechanical rewind switch 60, but adds few components, primarily the transistor 64, the diode 66, the capacitor 67 and the resistors 63 and 68. The playback head 62, the preamplifier 70 and the amplifier 71 already are present in the telephone answering device, since they are normally used to amplify the recorded messages during playback from the tape 11. To this end, the amplifier output terminal 71a also is connected via a resistor 74 and a diode 75 to the usual audio output driver for the telephone answering device.

In the alternative embodiment of FIG. 7, the end of rewind condition is sensed by monitoring the brush noise from the message tape drive motor 18. When using this technique, the motor 18 advantageously is tightly coupled to the message tape drive system so that the motor 18 will stall when all of the tape is rewound. For example, the motor 18 may drive the message tape via appropriate gearing or other type of firm drive system which is shifted between forward and rewind positions by the cam control mechanism 10.

Power to the motor 18 is provided via a voltage regulator 80 and the primary 81a of a step-up transformer 81. For maximum rewind speed, the voltage regulator may be disabled during rewind so that the full +V source voltage is supplied to the motor 18 via the transformer 81.

The circuit of FIG. 7 operates in conjunction with the capacitor charging portion of the circuit 61 of FIG. 6. To this end, the secondary 81b of the transformer 81 is connected via a capacitor 82 to the base node 64a of the transistor 64. Since detection of the motor brush noise is used in place of audio pickup during rewind, the output of the amplifier 71 (FIG. 6) is disconnected from the node 64a by eliminating the resistor 73.

Circuit operation is similar to that described in connection with FIG. 6. During rewind of the tape 11 the node 48 is low so that the transistor 64 is not biased off. The capacitor 67 begins to charge via the resistor 68. However, while the motor 18 is rewinding the tape 11, motor brush noise is produced. This noise consists of current transients which occur as the motor brushes make and break electrical contact. The noise transients are coupled via the transformer 81 and the capacitor 82 to the base of the transformer 64. This causes the transistor 64 to turn on intermittently, thereby concomitantly discharging the capacitor 67 and preventing that capacitor from becoming fully charged.

When rewind is complete, the motor 18 stalls. As a result, no further brush noise is produced. The transistor 64 remains off, and the capacitor 67 charges to a sufficiently high level so as to switch the state of the amplifier 40 as described above in connection with FIG. 5. In this manner, termination of the motor 18 brush noise is used to detect the end of rewind condition.

I claim:
1. A telephone answering device of the type having incoming message recording means, operative during automatic answering operation, to record an incoming message on a tape driven by a tape drive element, and having automatic playout means for playing out recorded incoming messages over the telephone line under remote control in response to detection of a coded signal, said device having the improvement comprising:
    a cam mechanism including a cam and a cam drive motor for driving said cam, said tape drive element being positionable by said cam alternatively to a forward position in which said tape drive element drives said incoming message tape in a forward direction and to a rewind position in which said tape drive element rewinds said tape, said cam mechanism normally operating in response to receipt of said coded signal, cam control circuit means, operative when power first is applied to said device, for determining if said cam is in a first orientation with said tape drive element in said forward position, and if not, for energizing said cam drive motor to drive said cam to said first orientation, said cam mechanism then being in readiness for normal operation in response to receipt of said coded signal, and audio responsive circuit means, connected to the playback head associated with said incoming message tape, for monitoring the audio signal output from said playback head while said incoming message tape is being rewound and said tape drive element is in said rewind position, and for providing an end-of-rewind signal in response to the termination of said audio signal output, and means for causing said motor to drive said cam into said first orientation in which said tape drive element is in said forward position in response to occurrence of said end-of-rewind signal.

2. A telephone answering device of the type having incoming message recording means, operative during automatic answering operation to record an incoming message on a tape driven by a tape drive element, and having automatic playout means for playing out recorded incoming messages over the telephone line under remote control in response to detection of a coded signal, said device having the improvement comprising:

a cam mechanism including a cam and a cam drive motor for driving said cam, said tape drive element being positionable by said cam alternatively to a forward position in which said tape drive element drives said incoming message tape in a forward direction and to a rewind position in which said tape drive element rewinds said tape, said cam mechanism normally operating in response to receipt of said coded signal, cam control circuit means, operative when power first is applied to said device, for determining if said cam is in a first orientation with said tape drive element in said forward position, and if not, for energizing said cam drive motor to drive said cam to said first orientation, said cam mechanism then being in readiness for normal operation in response to receipt of said coded signal, and wherein said tape drive element has an associated message tape drive motor, and further comprising:

motor brush noise responsive circuit means for sensing the brush noise from said message tape drive motor while said incoming message tape is being rewound and said tape drive element is in said rewind position, and for providing an end-of-rewind signal in response to the termination of said brush noise resultant when said motor stalls upon completion of rewind, and means for causing said motor to drive said cam into said first orientation in which said tape drive element is in said forward position in response to occurrence of said end-of-rewind signal.

3. A telephone answering device of the type having means for recording incoming messages on a message tape during a normal answering cycle, said message tape being driven by a motor, and having means for playing out recorded incoming messages under remote control in response to the receipt of a coded signal, and having a control mechanism, cooperating with said motor and operated in response to receipt of said coded signal, for rewinding said message tape and then driving said message tape forward for remote playout, said device having the improvement comprising:

motor brush noise responsive circuit means, connected to sense the brush noise from said message tape drive motor during rewind of said incoming message tape, for providing an end-of-rewind signal in response to the termination of said motor brush noise when said motor stalls at the completion of rewind, said control mechanism terminating said rewind and initiating the forward driving of said message tape in response to the occurrence of said end-of-rewind signal.

4. The improvement of claim 3 wherein said motor responsive circuit means comprises:

a capacitor connected to be charged via a resistor from a voltage source, a transistor connected to discharge said capacitor when said transistor is turned on, the sensed motor brush noise being utilized to turn on said transistor, so that said capacitor will not fully charge to a certain level while said motor brush noise is being produced during rewind of said incoming message tape, the absence of said motor brush noise, resultant when said message tape has been completely rewound and said motor stalls, enabling said transistor to remain off sufficiently long for said capacitor to be charged via said resistor to said certain level, said end-of-rewind signal being produced in response to the charge of said capacitor reaching said certain level.

5. The device of claim 3 further having a drive system for driving said message tape, said motor being tightly coupled to said drive system.

* * * * *